United States Patent [19]

Longman

[11] 4,106,669
[45] Aug. 15, 1978

[54] SUGAR CANE PLANTING MACHINES

[76] Inventor: Sidney E. Longman, 510 Ibert St., Franklin, La. 70538

[21] Appl. No.: 665,108

[22] Filed: Mar. 8, 1976

[51] Int. Cl.² ............................................. B65H 5/12
[52] U.S. Cl. .................................... 221/217; 221/231
[58] Field of Search ...................... 214/83.1, 519, 82; 221/217, 220, 218, 237, 253, 231; 111/3, 2

[56] References Cited

U.S. PATENT DOCUMENTS

| 2,950,770 | 8/1960 | Wilson | 111/3 X |
| 3,465,902 | 9/1969 | Colletti | 111/3 X |
| 3,468,441 | 9/1969 | Longman | 111/2 X |

Primary Examiner—Stanley H. Tollberg
Attorney, Agent, or Firm—Holman & Stern

[57] ABSTRACT

A sugar cane planter cart having a circular plate rotatably mounted in a vertical plane within the cart adjacent a load of sugar cane stalks. The plate has a plurality of V-shaped elements about its periphery to engage a stalk with the V and drive the stalk downwardly and rearwardly from the load. The plate is carried on the end of a boom mounted on the cart having both horizontal and vertical movement to engage the exposed layer of stalks. The V-shaped elements can be detachably mounted and are generally made of mild steel with a buna-type rubber sheathing. The plate is rotated by a hydraulic motor means. The boom has a counterbalancing weight for ease of vertical movement control and a hydraulic assembly for horizontal movement.

9 Claims, 9 Drawing Figures

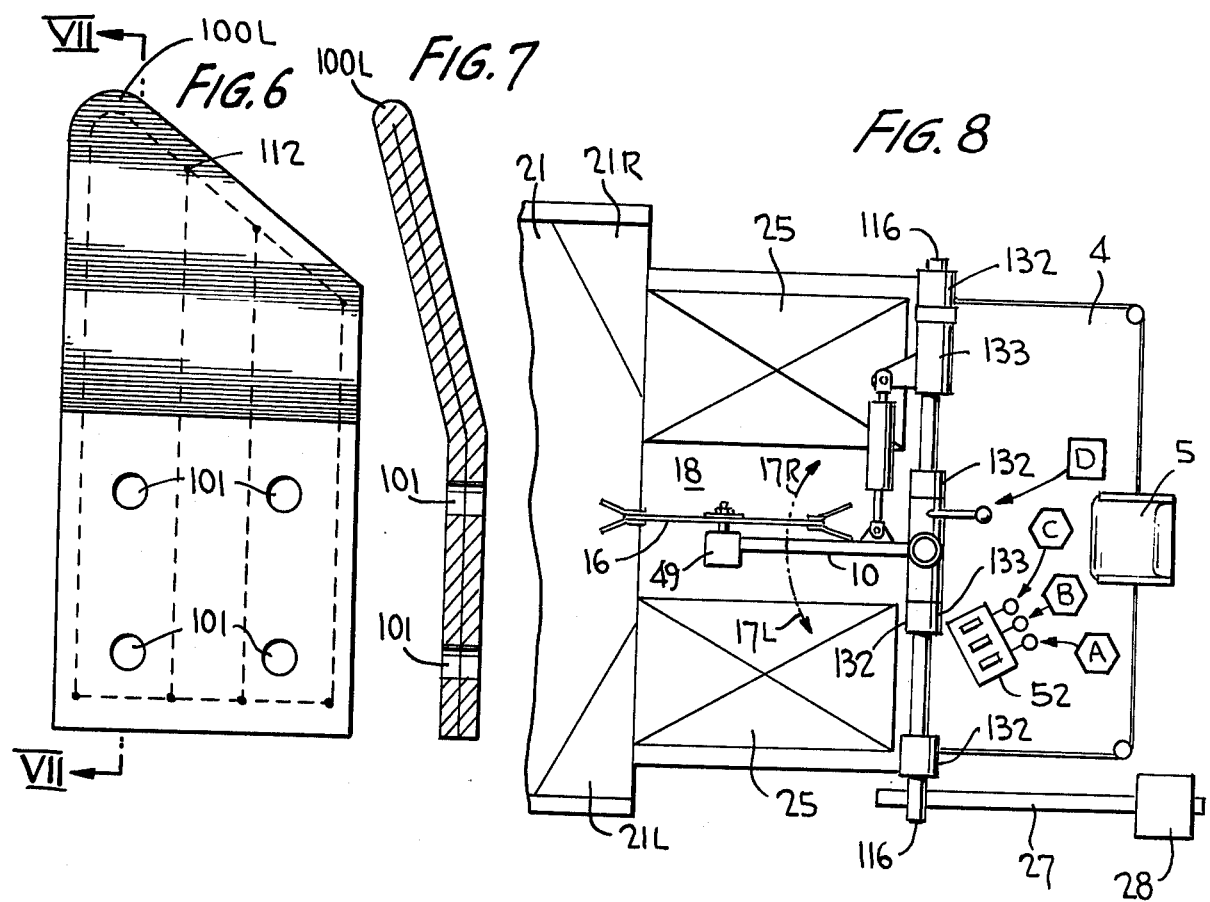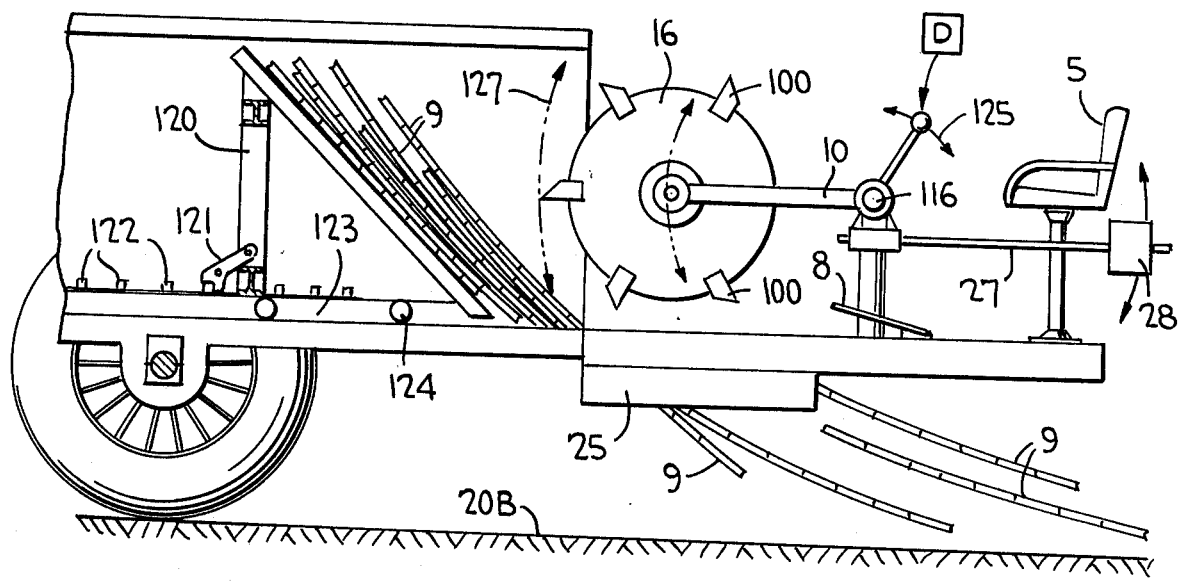

SUGAR CANE PLANTING MACHINES

INTRODUCTION

The present invention relates to planters and, more particularly, to sugar cane planters.

The components of the present invention are assembled in a sugarcane farm-cart as follows: Unit "A" is a hydraulic-ram driven, ratchet device which pushes the load of sugarcane towards the rear of cart where the dispensing equipment is mounted, by means of a wheeled headwall attached to the ratchet bar as described in U.S. Pat. No. 3,422,973. Unit "B" is a disc similar to a large saw, but with six to eight hook-shaped claws instead of teeth, rotating with hydraulic motor power so as to claw and sweep the advancing cane from the cart. Unit "C" is a hydraulic piston which swings the claw-disc and motor as mounted on a short steel boom, cross-wise over the load of cane. Unit "D" is a lever to be handled by the operator, carefully counterweighted, so as to lift the short steel boom and claw-disc, or drop it, to engage the cane stalks. Units "A", "B", and "C" have adequate valves and control handles for the operator, who is seated over the discharge focus, co-ordinating the A-B-C with his manual maneuvers of the dispensing disc.

U.S. Pat. No. 3,422,973, and U.S. Pat. No. 3,468,441 have used the novelty of Unit "A", as an "Aid to Planters". While essential to the planting system, Unit "A" is only an accessory to the novel machine herewith disclosed.

OBJECTIVES

Hand planting of sugarcane has not yet been displaced by machines, successfully, after 70 years of recorded patents of beautiful machines which could not cope with the twisted shapes and heavy stalks of sugarcane seed. The Cane industry has not bought these planters because they are too costly to make and too costly to operate. My objectives for the present invention are:

First: to manufacture a machine that will supplant hand labor as much as 75%...

Second: to fabricate a machine that will not cost much so every farmer can buy several planters..

Third: To simplify the planter design, so it may be attached to the cane-cart thus saving money for the planter "CARRIER"...

Fourth: To employ the man-monitor of planting operations as an operator who actually conducts the sowing of seed, with the powerized assists.., Fifth: To design a device that is practical to dispense irregular shapes and sizes, as are the canefield seeds.., Sixth: To design and fabricate a focus of control and operation with a minimum of structural members... and Seventh: To shape the discharge path of cane seed, so as to insure the placing of the cane in the furrow on the ground, without additional labor.

The invention will be better understood, and the above objectives and others will become apparent after reading the following detailed description of an embodiment of the present invention in conjunction with the drawings.

BRIEF DESCRIPTION OF THE DRAWINGS

FIG. No. 1 Is a bird's eye view of planter cart in accordance with the present invention with an operator seated at the control station of dispenser, on rear end of the cart.

FIG. No. 2 is a hydraulic schematic of the components A-B-C and D, to illustrate the hydraulic circuits, and the manual function of the operation of the present invention.

FIG. No. 3 is a vertical view of the flip-flop operator of the ratchet-pawl pusher for the transport trolley within the cane cart.

FIG. No. 4 is a lateral view of the dispensing disc with the claws attached.

Figure 4:
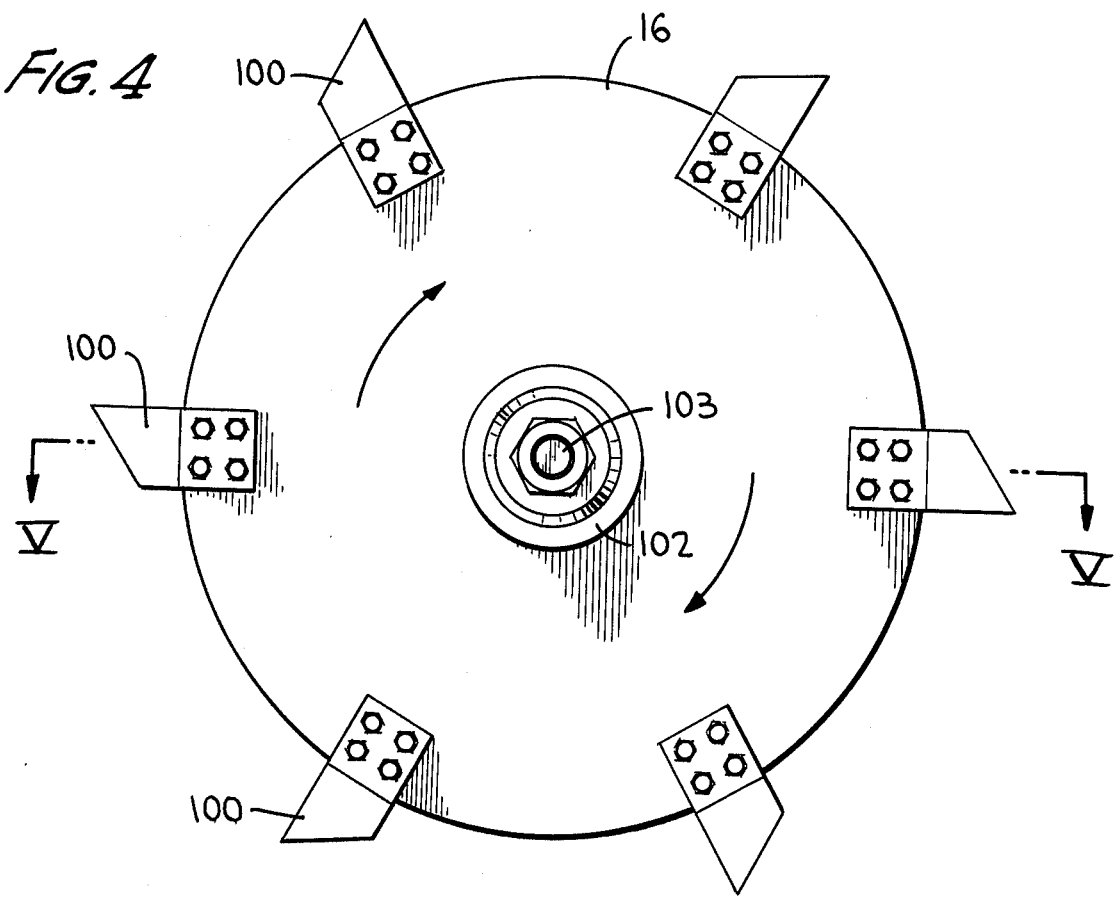

FIG. No. 5 is a view taken along lines V—V of FIG. 4 of the dispensing disc with the hydraulic motor and a fragment of the supporting boom.

FIG. No. 6 is a lateral view of a claw.

FIG. No. 7 is a cross-sectional view of a claw plate taken along lines VII—VII of FIG. 6.

FIG. No. 8 is a plan view of the operator's deck of the dispensing assembly.

Figure 1:
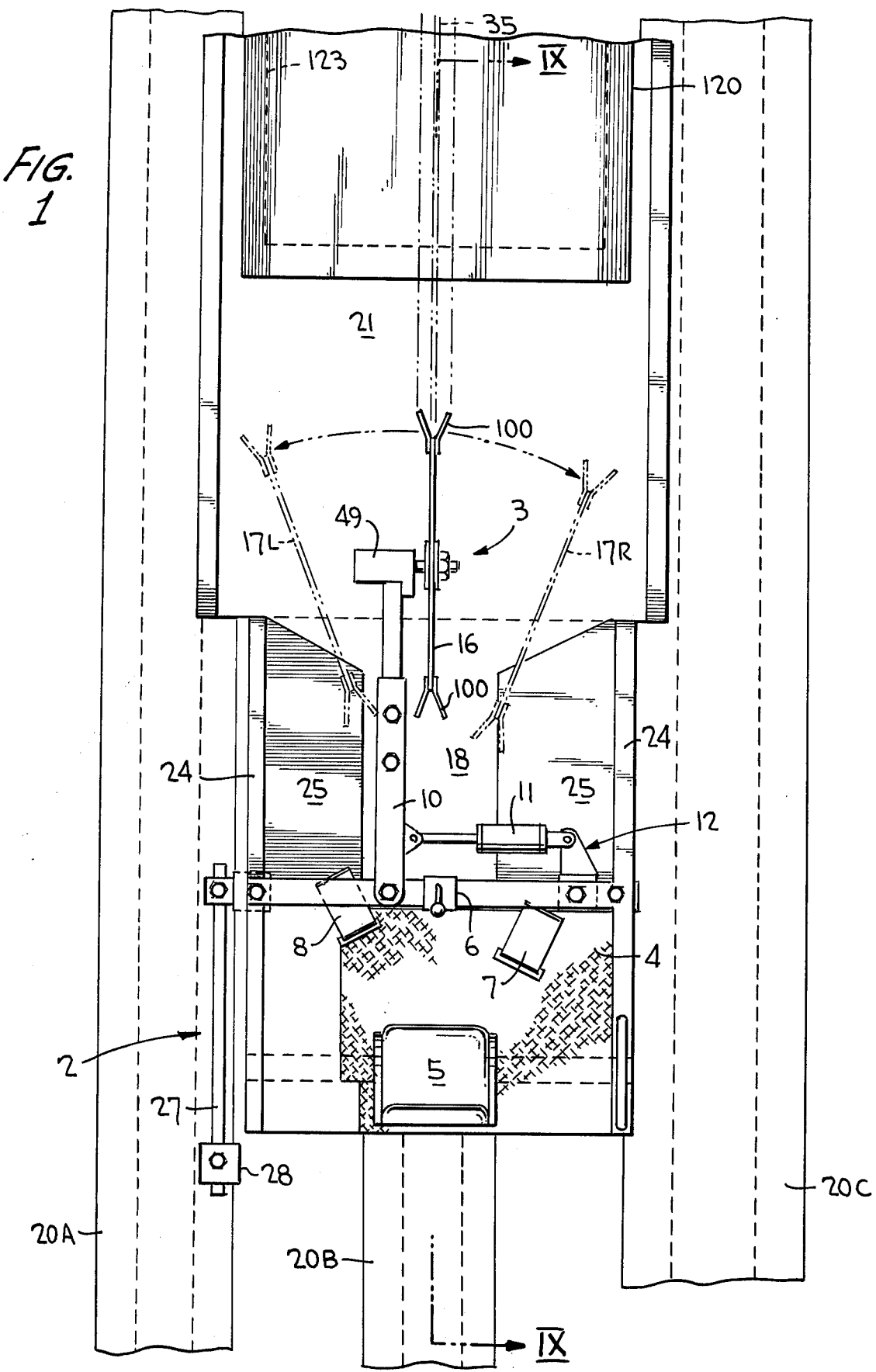

FIG. 9 is a cross-sectional view of the present invention taken along lines IX—IX if FIG. 1.

DETAILED DESCRIPTION OF A PREFERRED EMBODIMENT

In the several views of the drawings, like parts are indicated by like reference numerals.

Figure 2:
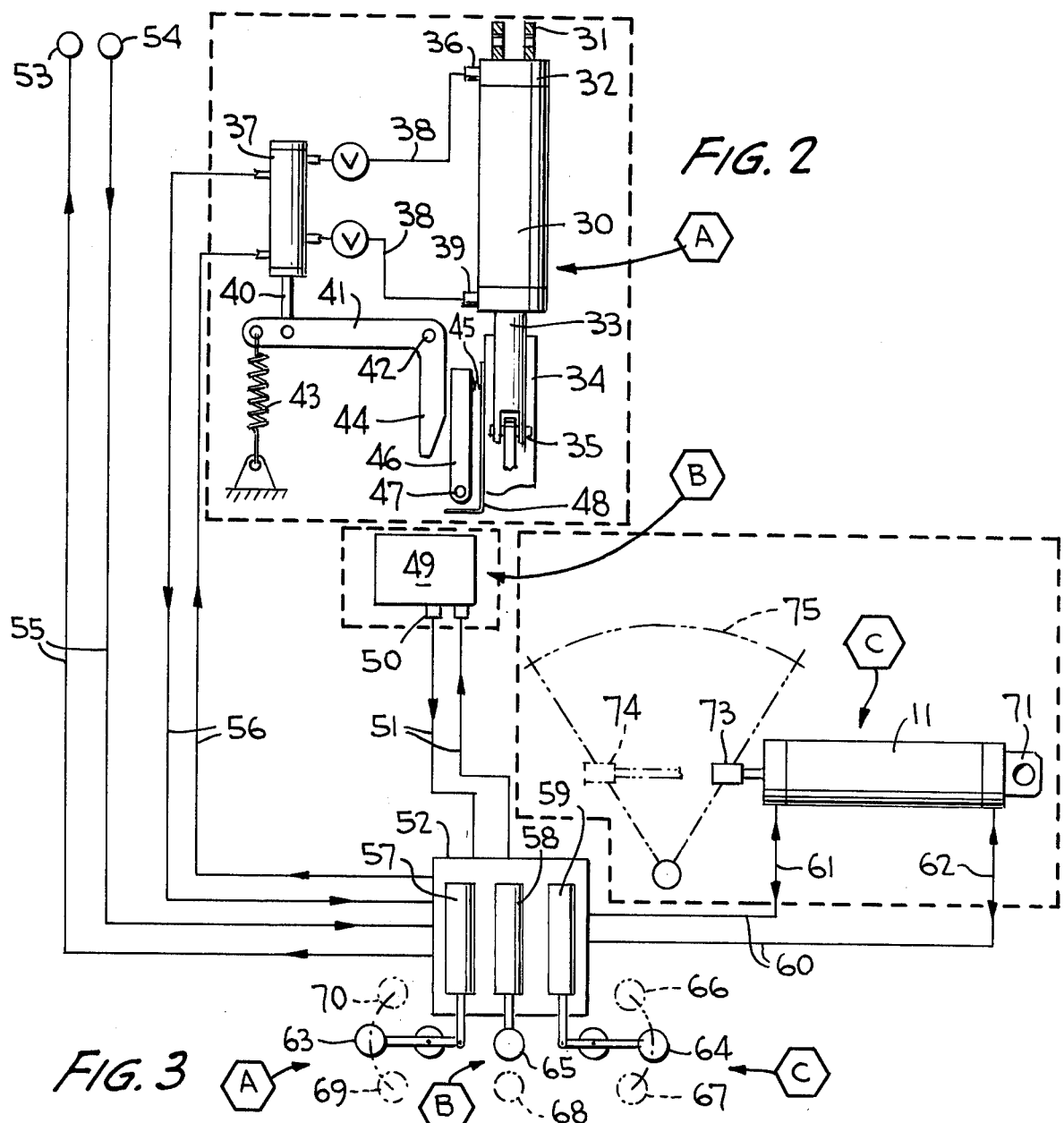

FIG. No. 1 generally shows the present invention. A circular dispensing disc assembly 3 is mounted on a cart 1. Frame members 24 extend rearwardly from the cart 1 on which are mounted a deck 4 and a seat 3. A vertical control means 6 is mounted near the lateral center of the deck for vertical movement of the disc assembly 3. The assembly 3 includes a boom 10 and circular disc 16 formed as a plate having V-shaped elements 100 hereafter referred to as "claws". The disc 16 is rotatably mounted on the boom 10 and is rotated by hydraulic motor means 49. The assembly 3 is counterbalanced by a means 2 including a lever 27 and a slidably adjustable weight 28. The boom 10 is movably horizontally by a means 12 including a double-acting hydraulic cylinder 11 to thrust limits of travel 17L and 17R. The means 12 can be operated by foot pedal 7 as a reversible flow control valve 59 as can be seen in FIGS. 2 and 8. The load of cane stalks 21 is moved downwardly and rearwardly by the action of disc 16 through slot 18 flanked by funneling plates 25 into a furrow 20B. An already planted furrow is indicated by 20A and an empty furrow to be planted during the next pass of the cart is indicated by 20C. Foot pedal 8 (or alternatively reversible control valve 57 in FIG. 2) controls the movement of a push trolly 120 for moving the cane stock load 21 rearwardly in the cart 1. In FIG. 2, the operational power schematic shows three distinct functions. Power is delivered through the quick connect source of hydraulic pressure from a hydraulic system on a tractor towing system (not shown). The system connects through return fitting 53 and the pressure fitting 54. The source of hydraulic power is conducted by lines 55 into manifold 52, where valves 57-58-59 control functions HEX A, HEX B and HEX C by means of knobs 63-64-65. Foot treadles 7, 8 are optional, detent-action valves 57, 59 may be desired in their place by some operators.

The control function HEX A is concerned with the operation of the planting aid described in my U.S. Pat. No. 3,422,973. The controlled device is the pusher cylinder 30 attached at 31 to the cart. The hydraulic fluid is controlled by valve 57. It then flows through a double acting valve 37 with stem 40 attached to "L" shaped lever 41 pivoted on pin 42. Leg 44 of lever 41 is in contact with free lever 46 pivoted on 47 and spring loaded by spring 45. Free lever 46 will shuttle axially with the piston rod 33 attached to jacking ratchet 34 on the ratchet bars 35, since free lever 46 is integral with the motion of piston in cylinder, being attached to ratchet assembly by means of the strip of channel 48 containing the pivot pin 47.

Function HEX A operates as follows: As the jacking bar is pushed past the intersection of the ends of free-lever 46 and "L"-lever 44, spring 43 in tension will pull lever 41 away from double acting valve 37 pulling valve stem 40 with it. This permits pressure to be transmitted through port 39 on cylinder 30, which returns to end 32, and retracts the ratchet plate 34.

Figure 3:
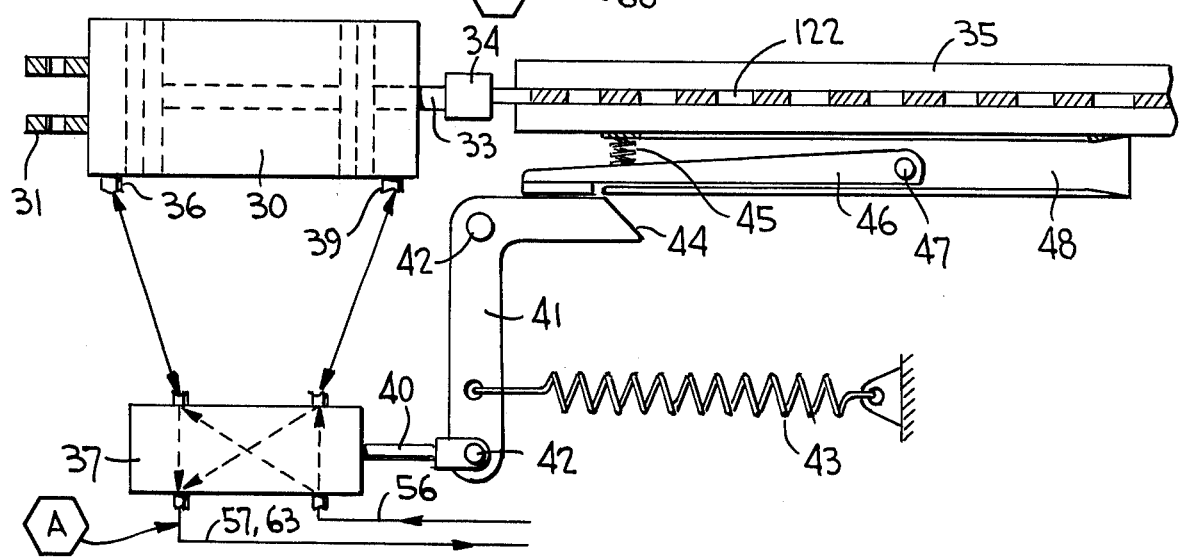

The device as shown in FIG. No. 2 is in position to initiate a pushing stroke, with pressure to port 36 and discharge at port 39. When the rod 33 finishes its stroke, lever 46 will have moved past the leg 44 permitting spring 43 to reverse pressure flow in valve 37 as described above. This cycling will repeat until operator's control 57 is cut. This is the mechanical oscillator or "Flip-flop", to pulse the cane towards the dispenser. Function HEX B concerns the rotation of the dispensing disc. The valve 58 in the manifold conducts pressure and return liquid through lines 51, coupled at 50 to drive a hydraulic motor 49 which rotates the disc 16. The disc 16 is equipped with a plurality of specially shaped claws 100 to engage the sugarcane stalks and sweep them off the tail of cart. This drive is a simple function; reversibility is not needed. Power and R.P.M. may be modified by valve action. Function HEX C concerns the swinging of the dispensing disc 16 from side to side. The piston strokes from 73–74. The cylinder 11 has a clevis which is attached to disc boom arm 10. The cylinder 11 is fixed at point 71. Hydraulic power from manifold 52 is delivered through reversable control 59 by lever 64 wherewith power conveyed by lines 60 may enter coupling 62 and leave 61 conection, or, reverse flow at the will of operator. In FIG. 3, the flip-flop, hydro-mechanical reciprocator device is an improvement over previous operational devices to effect the advancement of cane in the cart, towards the rear, for any purpose. Amplified in scale, to better explain the valve action, similar to a duplex, steam-driven pump, the valve stem 40 is triggered by the "L" lever 41 when leg 44 is released as the ratchet bar 35 carrys free lever 46 away from the cylinder 30. Free lever 46 flips free of the leg 44 permitting spring 43 to snap lever 41 and its operator stem 40 outwardly. This is the reverse hydro-flow phase of the circuit which returns 33 34 35 close to the operating cylinder, re-setting leg 44 on the free lever 46. Power control is effected through lines 56 to HEX A where the valve 57 and duplex lever 63 is operated at the operating or dispensing deck 4. The reversing valve 57 can operate the flip-flop feed of cane, manually, should the automatic device fail.

Figure 5:
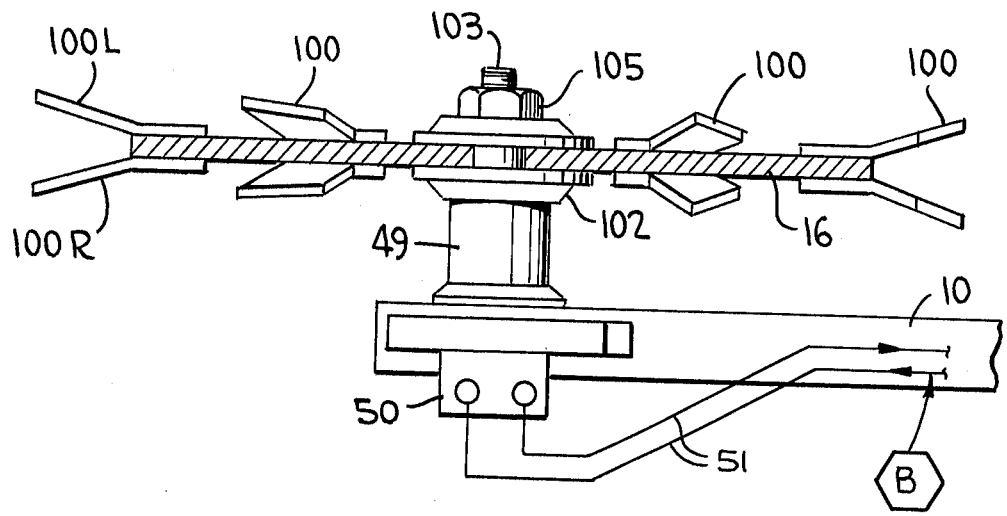

The dispensing disc 16 of FIGS. 4 and 5 is mounted on the shaft 103 of a hydraulic motor 49 between steel boss plates 102 and secured by nut 105, much as a saw blade. The claws 100 may be applied to the disc 16 with any means for attaching such as rivets or cap screws with nuts through holes 101 (FIGS. 6 and 7). A variable number, two to ten, has been tested, and five or six claws seem optimum. Rotation clockwise for leading points is correct.

As can be seen in FIG. 5, the claws are formed as bent plates 100L and 100R. Economical mass production dictates a power stamped plate instead of a fabricated left and right pair in one casting. Since the work done is abrasive and tough, steel is preferred. The rotating claws and motor are mounted or bolted to the hand crane or boom 10. Power supply connected at 50 flows through lines 51 to the function center and control valve 58 for HEX B.

The Planter's controls are shown on FIG. 8, where the three HEX functions controls A-B-C are standing to left of operator's seat, and one manual control, marked Square "D" appears at the center. Cane from the cart area 21 is compacted towards the center of the dispenser by baffle-plates 21L and 21R, so that the arc made by cylinder 11 at thrust limits 17L to 17R, will swing the clawed disc 16 through ample coverage of cane supply. Two funneling plates 25 guide the flow of seed-stalk to slot 18. A transverse steel pipe shaft 116 is shown with pipe nipple sleeve bearings 132 and retainers for each mechanical articulation. The manual Square "D" function, i.e. lifting of the disc 16, up and down, rotates the shaft 116 and the counterbalance lever 27 holding the adjustable weight 28.

FIGS. 6 and 7 show a claw-plate 100 in a full scale view of plan 100 left and edge view respectively. A Buna rubber vulcanized blade, re-enforced with steel wire 112 would be better than a bare steel blade. A bent steel blade with vulcanized Buna glove would not damage the cane and perform best.

In FIG. 8 the push-trolley 120 in the cane cart is retained between ratchet thrusts by pawl lock 121 resting on steel cleats 122 welded to channel guides 123 for the trolley wheels 124. Cane seed 9 is seen in cart position and flowing to the ground, kicked off the cart by dispenser claws 100, revolving on disc 16. Vertical position of the dispensing disc may be changed through arc 127 by manipulation of knob and lever 125, through and by means of boom 10. This vertical function of dispenser, Square "D", rotates on pipe shaft 116 within a larger pipe bearing 132 on each side of Square "D" assembly, and also by means of bearing supports 132 at both sides of cantilevered frame structure of Planter unit. The internal pipe shafting 116 carrys the arm 27. Thus, it can be clearly seen that the objectives set forth initially have been successfully achieved.

I claim that these are novel and useful elements of my sugarcane planter:

1. A sugar cane planter cart comprising a cart,
   a boom pivotally mounted on said cart, and
   a circular plate rotatably mounted in a vertical plane within said cart on said boom adjacent a load of sugar cane stalks and having a plurality of V-shaped elements about the periphery of said plate to engage a stalk within the V and drive the stalk downwardly and rearwardly from the load, said boom having pivotal movement both vertically and horizontally to permit the elements to engage the exposed layer of stalks.

2. The planter of claim 1, further comprising hydraulic motor means for rotating said plate mounted on said boom operatively connected to said plate.

3. The planter of claim 1, further comprising means for counterbalancing said plate and said boom.

4. The planter of claim 3, wherein said means for counterbalancing comprises a lever oppositely operatively associated with said boom and an adjustable weight slidably mounted on said lever.

5. The planter of claim 1, further comprising means for hydraulically swinging said boom for horizontal movement secured between said cart and said boom.

6. The planter of claim 1, wherein said V-shaped elements are detachably mounted on said plate by means for attaching.

7. The planter of claim 6, wherein each V-shaped element comprising a left bent piece and a right bent piece which when mounted on said plate with said means for attaching form a V.

8. The planter of claim 6, wherein each piece is made of steel and has a buna-rubber sheath.

9. The planter of claim 6 wherein each piece is made of buna-rubber with steel wire reinforcing.

* * * * *